INVENTOR.
PAUL A. AVERY

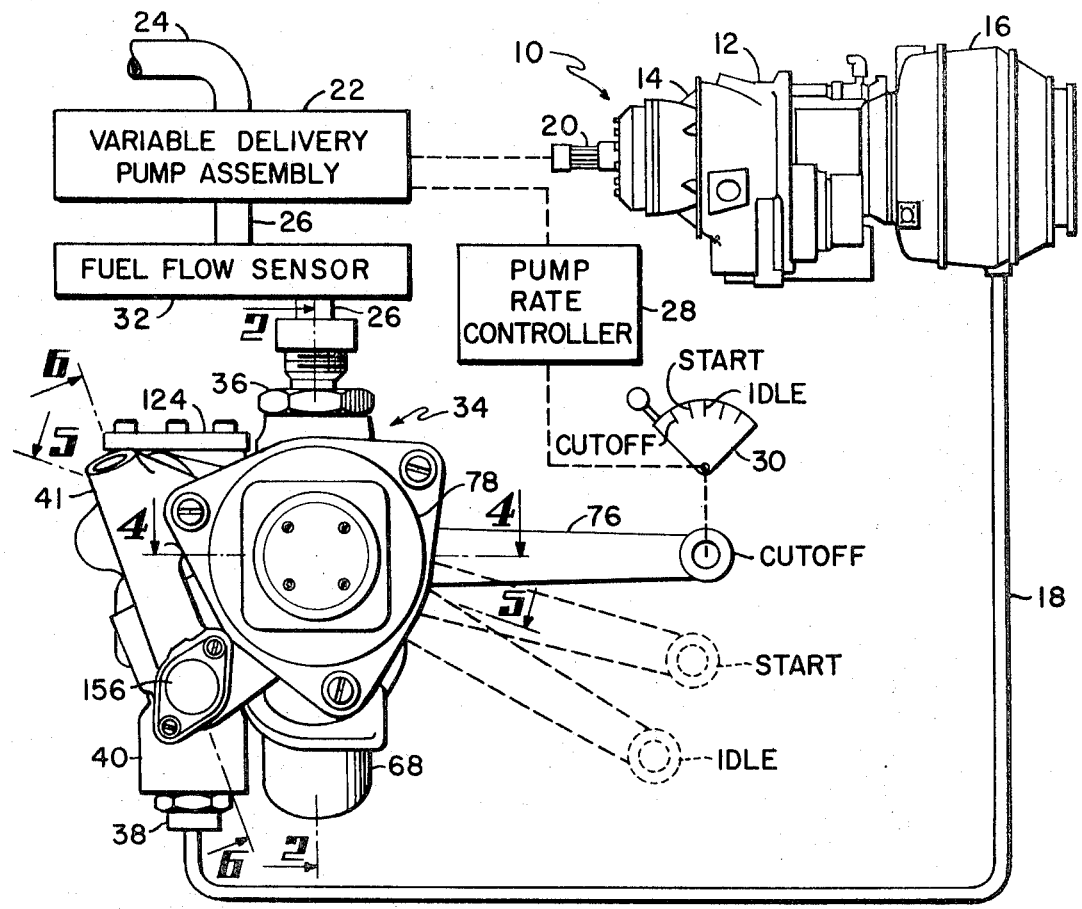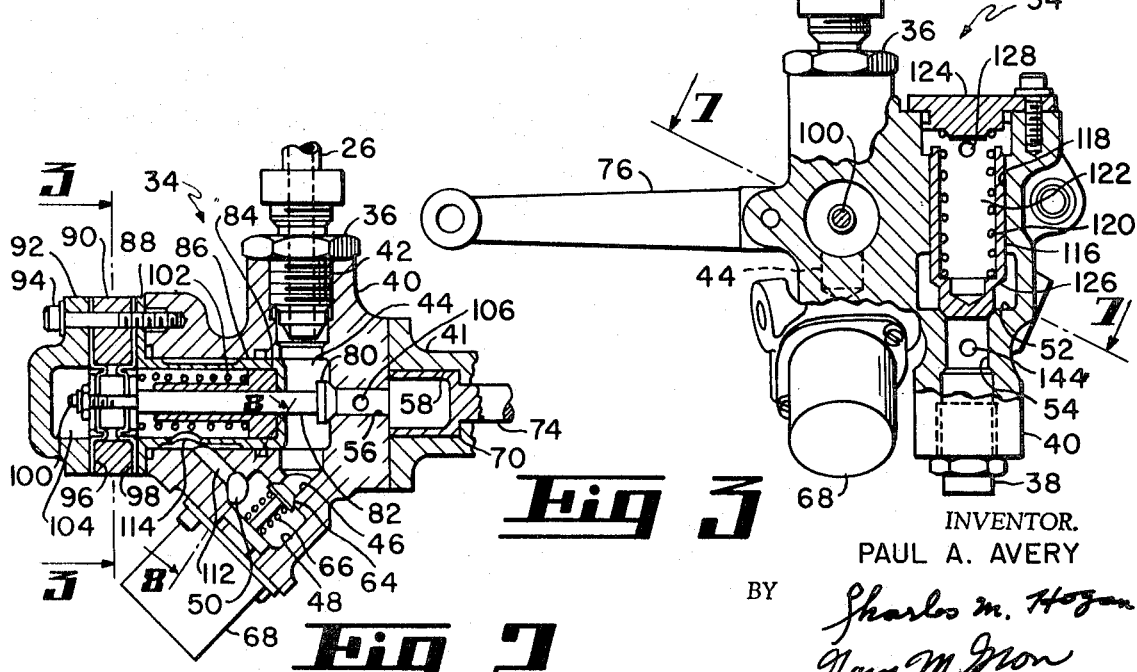

United States Patent Office 3,618,315
Patented Nov. 9, 1971

3,618,315
EMERGENCY FUEL FLOW CONTROL DEVICE
FOR A GAS TURBINE ENGINE
Paul A. Avery, Shelton, Conn., assignor to Avco
Corporation, Stratford, Conn.
Filed Feb. 19, 1970, Ser. No. 12,718
Int. Cl. F02c 9/06
U.S. Cl. 60—39.28                         10 Claims

ABSTRACT OF THE DISCLOSURE

The disclosure illustrates an emergency flow control device for use in the fuel control system of a gas turbine engine. The flow control device comprises a housing having a pair of low resistance flow paths which receive the output of a variable delivery pump and provide a discharge to the gas turbine engine. A bistable solenoid operated bypass valve is positioned in the first flow path to selectively block and permit flow. A sleeve-type metering valve is positioned in the second flow path and rotated by a manually operated lever to provide a variable area orifice. A diaphragm operated throttling valve element is positioned upstream of the metering valve element. Pressure connections to the upstream and downstream side of the metering valve element are connected to the diaphragm. The throttling valve element maintains a constant pressure differential across the metering valve when the bypass valve element blocks flow through the second flow path. The bypass valve element is responsive to a condition where a controller for the variable output pump is inoperative and places the pump in a maximum delivery condition. In addition, a cutoff valve is provided in the outlet to pass flow to the engine only when a control input is provided. A manual control input from the operator lever and a solenoid input each operate to place the cutoff valve element in an open or closed position.

---

The present invention relates to flow control devices and more specifically to devices of this type that are used in the fuel control systems of gas turbine engines.

In the quest for highly efficient and simplified control of fuel for gas turbine engines there have been a number of notable advanced fuel control arrangements. One such advance may be found by reference to copending application Ser. No. 872,938, filed Oct. 31, 1969, entitled "Integrated Fuel Control System for a Gas Turbine Engine," of common inventorship and assignment with the present invention.

That application describes a centrifugal fuel pump driven by an infinitely variable speed drive. The variable speed drive receives control inputs reflecting scheduled fuel flow and actual fuel flow to provide an error signal which increases or decreases the output of the centrifugal pump to achieve the correct flow. The advantage of this system is that it eliminates the complex valving arrangement commonly found in modern gas turbine fuel control systems.

To make such a system operational in an engine it is necessary to provide a backup control that takes over the metering function of the fuel control system should the control system for the variable speed drive fail. In addition, it is necessary to provide a cutoff function which minimizes dribbling of flow from fuel nozzles and the resultant coking when engines are shut down.

Accordingly, it is an object of the present invention to provide an economical, compact and reliable flow control device for use with the above general type of fuel control system that performs an emergency metering valve function and provides other flow control functions.

In the broader aspects of the present invention the above ends are achieved by providing a flow control valve assembly in a gas turbine engine which has a variable delivery pressurizing device and a device for controlling the delivery rate of the pressurizing device. The controlling device is adapted to be inoperative in a position calling for maximum flow from the pressurizing device. The flow control valve assembly comprises a housing having an inlet connected to the output of the pressurizing device and an outlet providing a discharge to the engine. The housing has first and second relatively unobstructed fuel flow paths from the inlet to the outlet and a bypass valve element is displaceable in the first flow path to selectively block and permit flow through the first flow path. A metering valve element is displaceable in the second flow path and is annually operative to provide a variable area orifice in the second flow path. A device is provided for throttling flow upstream of the metering valve element to maintain a predetermined pressure differential thereacross. The bypass flow element is responsive to the placing of the pressurizing means at a maximum output condition to block flow through the second flow path to enable manual control of fuel flow to the engine.

In a more specific aspect of the present invention, the above flow control device incorporates a cutoff valve element which permits flow to the engine only when a control signal is present.

The above and other related objects and features of the present invention will be apparent from a reading of the description of the disclosure shown in the accompanying drawings and the novelty thereof pointed out in the appended claims.

In the drawings:

FIG. 1 is a view of a flow control device embodying the present invention, along with pertinent components of a gas turbine engine and fuel control system with which the flow control valve may be used;

FIG. 2 is a section view of the flow control valve of FIG. 1 taken on lines 2—2 of FIG. 1;

FIG. 3 is a section view of the flow control valve of FIG. 1 taken on lines 3—3 of FIG. 2;

Figure 4:
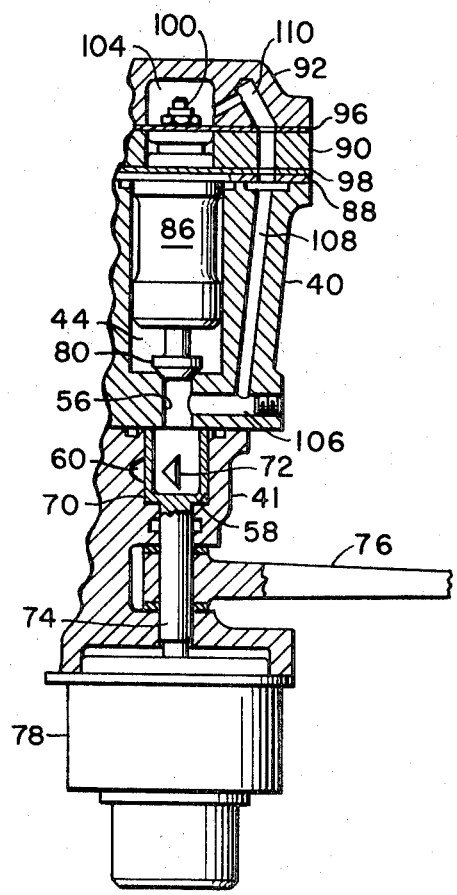
Figure 6:
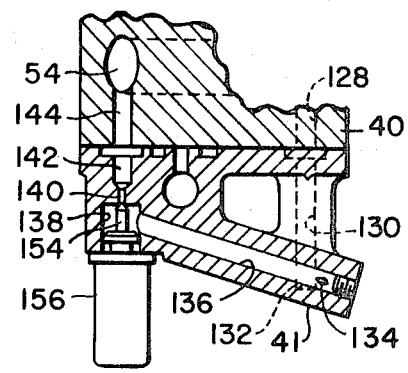
Figure 5:
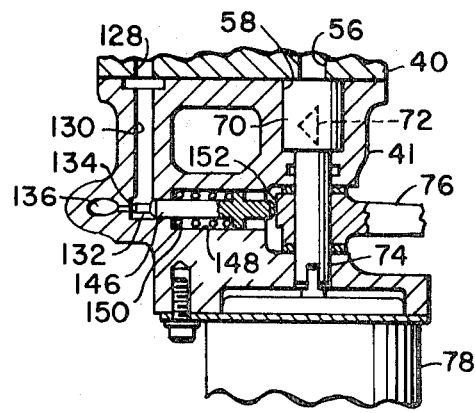
Figure 7:
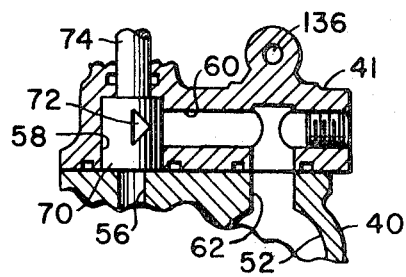
Figure 8:
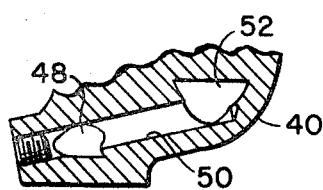

FIGS. 4, 5 and 6 are fragmentary section views of the flow control valve of FIG. 1, respectively taken on lines 4—4, 5—5 and 6—6 of FIG. 1;

FIG. 7 is a fragmentary section view taken on lines 7—7 of FIG. 3;

FIG. 8 is a fragmentary section view taken on lines 8—8 of FIG. 2.

Referring to FIG. 1 there is shown a gas turbine engine 10 with which the flow control valve embodying the present invention may be used. The engine 10 has a compressor assembly 12 which receives air from an inlet 14 and pressurizes it for delivery to a combustor assembly 16. Fuel nozzles (not shown) which receive fuel from a nozzle supply conduit 18 inject a metered supply of fuel into the combustors. The resultant mixture of pressurized air and fuel is ignited by well known means to provide a high energy propulsive gas stream. This gas stream is passed across a first turbine assembly (not shown) which drives the compressor assembly 12. From there the flow may be discharged through a jet nozzle to provide a reaction propulsion or it may be passed across a power turbine to provide a rotatable output via shaft 20.

The engine 10 is supplied with fuel from a fuel control system comprising a variable delivery pump assembly 22 which receives fuel from an inlet conduit 24 and pressurizes it for delivery through an output conduit 26. The output of the pump is controlled by a controller 28 which generates a scheduled fuel flow signal from operator demand input via operator controlled power lever 30 and other control inputs which reflect various operating conditions of the engine. The scheduled fuel flow signal is compared to the signal from a fuel flow sensor 32 interposed in conduit 26 to generate an error signal which is used to actuate the variable delivery pump assembly 22.

The variable delivery pump assembly may be one of a number of types that can be employed for this purpose. However, it is particularly advantageous to use the variable delivery pump assembly shown in copending application Ser. No. 872,938, referred to above. In that assembly there is shown a centrifugal pump driven at variable speeds by a toroidal type variable speed drive. The pump rate controller 28 may be an electronic device which generates an output signal that is mechanically connected to the variable delivery pump assembly to control the flow to the engine, as shown in the above application.

In order to provide a backup or emergency fuel metering device and, additionally, other flow control conditions, a flow control device 34 has an inlet connector 36 receiving the output of the variable delivery pump assembly 22 via conduit 26 and an outlet connector 38 connected to the nozzle supply conduit 18.

With reference to FIGS. 2–8 and particularly FIG. 2, the flow control device 34 comprises a central housing 40. A first relatively unobstructed flow path from the inlet connector 36 to the outlet connector 38 is defined by a bore 42 leading to a generally cylindrical chamber 44. A port 46 extends from chamber 44 to another cylindrical chamber 48 and passage 50 (see FIG. 8) to an outlet chamber 52 from which an outlet port 54 extends. A second relatively unobstructed flow path to the outlet is defined through a housing 41 by a port 56 through a cylindrical chamber 58 and a passageway 60 and port 62 to outlet chamber 52 and finally outlet port 54 (see FIG. 7).

As seen in FIG. 2, a bypass valve element comprising a plunger 64 is displaceable in chamber 48 against and away from port 46 to selectively block or permit flow through the second flow path. The plunger valve element 64 is biased against port 46 by spring 66 and is displaced in response to electrical control inputs by a solenoid assembly 68, screwed to housing 40. The solenoid assembly 68 is bistable so that the plunger 64 will remain in a closed or open position until a new electrical input signal is received.

A metering valve element comprising a sleeve 70 is displaceable in cylindrical chamber 58 of the second flow path. The sleeve 70 has an opening 72 which cooperates with port 60 to define a variable area orifice (see FIGS. 4 and 7). The opening 72 is shaped so that the area of the orifice is related to the rotational position of the sleeve 70. The sleeve 70 is rotated by an integral shaft 74 journaled in housing 41. A manually operated input lever 76 is secured to shaft 74. The lever 76 is mechanically connected to the power lever 30. The input lever 76 and power lever 30 are coordinated so that in the illustrated cutoff position the variable area orifice blocks flow. When the power lever is moved to a start position the lever 76 is moved to its start position (see FIG. 1) wherein the variable area orifice has a flow area necessary for start of the engine. As the power lever 30 is moved from start to idle and to normal operation, the area of the orifice is increased proportional to the steady state requirements of engine 10. A suitable rotational transducer 78 is secured to the end of shaft 74 so that it may provide an electrical signal representing the degree of rotation of the sleeve 70 and power demand level.

A throttling valve element comprising a plunger 80 is displaceable in chamber 44 against and away from port 56 to throttle flow from chamber 44 to chamber 58. An integral shaft 82 extends from plunger 80 through an opening 84 in a fixed sleeve 86 having a flange 88 that is sandwiched between a sleeve 90 and end cap 92 secured to housing 40 by screws 94 (only one of which is shown).

The end of shaft 82 is secured to opposite walls 96 and 98 of a diaphragm assembly by means of a bolt 100. The walls 96, 98 of the diaphragm assembly are fixed by sandwiching them between end cap 92, sleeve 90 and flange 88. The diaphragm assembly is biased in a direction tending to unthrottle flow into port 56 by a spring 102 which acts against the sleeve assembly 50 and wall 98 of the diaphragm.

The fuel pressure upstream of the metering valve element 70 is connected to chamber 104 formed in end cap 92 by radial port 106 extending from port 56, generally longitudinal passage 108 through housing 40, flange 88, sleeve 90 and passageway 110 through end cap 92 (see FIG. 4). With this connection the pressure upstream of metering valve element 70 is applied to the diaphragm assembly so that it urges the plunger 80 in a direction tending to throttle the flow to inlet port 56.

The pressure downstream of the metering valve element 58 is connected to the opposite side of the diaphragm assembly by port 112 extending from passage 50 to an opening 14 in sleeve element 86. It is noted with particular reference to FIGS. 7 and 8 that passage 50 is connected to outlet chamber 52 which is downstream of metering valve element 70, as seen particularly in FIG. 7.

As seen in FIG. 3, flow to outlet port 54 is controlled by a cutoff valve element comprising a piston valve element 116 which is displaceable in bore 118 in housing 40 toward and away from the end of port 54. Piston valve element 116 is hollow and is urged toward port 54 by a spring 120 acting on the interior 122 of piston 116 and against an end cap 124 screwed to housing 40. A shoulder 126 is formed on the piston valve element 16 so that when flow is blocked to port 54 the fuel in chamber 52 exerts a pressure force on the piston valve element 116 in a direction which would displace the piston 116 away from port 54.

A bleed flow of fuel is provided across piston valve element 116 by either providing a bleed flow port in the piston 116 or, as herein shown, by providing a loose clearance between piston 116 and bore 118 to permit a bleed flow of fuel from chamber 52 to the interior side 122 of piston 116. Bleed flow is carried from the interior side 122 of the piston 116 by a port 128 in housing 40 which extends to a passage 130 in housing 41 (see FIG. 5). Passage 130 extends to a chamber 132 which has a restricted area port 134 leading to another passage 136. Passage 136 extends to a chamber 138 in housing 41 (see FIG. 6). A restricted area port 140 extends from chamber 138 to port 142 which registers with a port 144 leading to outlet passage 54 downstream of piston 116.

The bleed flow path to the outlet is blocked by a mechanical or electrical control input. As shown in FIG. 5, the mechanical input comprises a plunger 146 displaceable in bore 148 in housing 41. Plunger element 146 is biased away from port 144 by a spring 150. Plunger element 146 is displaced against port 134 thereby terminating bleed flow by a cam lobe 152 integrally formed on operator input lever 76. The lobe 152 is positioned on lever 76 so that pivoting the lever to the illustrated cutoff position causes bleed flow to be terminated.

As shown in FIG. 6, the electrical control input for terminating bleed flow is derived from a plunger 154 displaceable in chamber 138 away and toward port 140 by a solenoid assembly 156. The solenoid assembly 156 receives an electrical input signal from the pump rate controller 28 to terminate flow when there is an indication of an adverse engine operating condition such as an over temperature during engine startup.

For normal operation of the engine 10 the engine is started by rotating the compressor assembly and rotating the variable delivery pump assembly to pressurize fuel for delivery to the engine. At this point power lever 30 is displaced from the illustrated cutoff position to the start position. This moves lever 76 to a position where cam lobe 152 is away from plunger 146 thereby permitting bleed flow through port 134. Solenoid 68 is placed in a flow-permitting position by the pump rate controller 28 through suitable means so that pressurized fuel from the variable delivery pump assembly flows through both the first and second flow paths to outlet chamber 52. The pressure in outlet chamber 52 is transmitted to wall 98 of the diaphragm assembly for the throttling valve 80 which urges it away from port 56 to permit an additional flow of fuel through the second flow path to the outlet chamber 52. It should be noted that at this point a variable area opening in orifice 70 is established which approximates the flow required for startup and idle of the engine.

The pressure in chamber 52 acting on shoulder 126 causes the cutoff valve element 116 to crack open and permit flow of fuel to port 54 and nozzle supply conduit. If an engine over-temperature occurs during this startup period, the pump rate controller 28 sends an electrical signal to solenoid 156 to block bleed flow across cutoff piston valve element 116. The pressures on opposite sides of piston 116 are then equalized and spring 120 urges it to a closed position. During normal conditions, however, the piston 116 would remain in the open position.

As the power lever 30 is advanced to the idle position and to normal operating conditions, flow passes through both the first and second relatively unobstructed flow paths to the nozzle supply conduit 18. This enables the flow control device 34 to remain in the fuel line when it is not operating in an emergency capacity without unnecessarily restricting fuel flow.

If for any reason the pump rate controller 28 fails, the variable delivery pump assembly 22 is designed to attain a maximum output condition in the absence of a control input. By suitable means from the pump rate controller 28 indicating an absence of control, solenoid valve 68 is displaced from the first stable position permitting flow through the first flow path to a position which blocks flow through the first flow path. In this case all of the flow passes from chamber 44 through port 56 and past metering valve element 70. The pressures upstream and downstream of the metering valve 70 are applied to opposite walls 96 and 98 of the diaphragm assembly so that plunger valve element 80 is variably displaced toward port 56 to throttle flow and maintain a constant pressure differential across metering valve element 70. The result of this is that the flow metered by valve element 70 is directly proportional to its area and since the lever 76 receives a mechanical input from operator power lever 30 the flow metered to the engine is substantially that scheduled by the pump rate controller for steady state conditions of the engine.

During an emergency condition the engine may be operated indefinitely on the manual metering valve 70. When it is necessary to shut the engine down the operator lever 30 is displaced to an "off" position which causes the lobe 152 to displace plunger 146 against port 144 thereby terminating bleed flow across cutoff valve 116. This causes the pressures on opposite sides of the piston 116 to be equalized so that the spring 120 exerts a net closing force which displaces piston 116 against output port 54. It is noted that either the solenoid 156 or the lever 76 may be used to terminate flow to nozzle supply conduit 18.

The above flow control element is highly compact and provides an effective means for metering flow to a gas turbine engine during emergency conditions. When it is not in use to meter flow it provides a minimum resistance to fuel flow thereby minimizing the heat input to the fuel during normal operating conditions. In addition, the flow control unit is highly compact and has a minimum weight penalty to the engine.

While a preferred embodiment has been shown, it will be apparent to those skilled in the art that other arrangements may be utilized without departing from the present invention.

What is claimed as novel and desired to be secured by Letters Patent of the United States is:

1. In a gas turbine engine fuel control system having a variable delivery pressurizing means and a means for controlling the rate of delivery of said pressurizing means, said controlling means being adapted to be inoperative in a position calling for maximum flow from said pressurizing means, a flow control valve assembly comprising:
a housing having an inlet connected to the output of said pressurizing means and an outlet providing a discharge to said engine;
means for providing first and second relatively unobstructed fuel flow paths from said inlet to said outlet;
a bypass valve element displaceable in the first flow path for selectively blocking and permitting flow therethrough;
a metering valve element displaceable in said second flow path and manually operable to provide a variable area orifice in said second flow path; and
means for throttling flow upstream of said metering valve element to maintain a predetermined pressure differential thereacross;
said bypass flow valve element being responsive to placing said pressurizing means at a maximum output condition to block flow through said first flow path to enable manual control of fuel flow to said engine.

2. Apparatus as in claim 1 wherein said throttling means comprises:
a throttling valve element displaceable in said second flow path upstream of said metering valve for variable restricting flow to said metering valve; and
means for displacing said throttling valve element in response to fluid pressures upstream and downstream of said metering valve element so that a predetermined pressure differential is maintained across said metering valve element.

3. Apparatus as in claim 2 wherein said throttling valve element displacing means comprises:
a shaft extending from said throttling valve element and having an end outside of said flow paths;
a diaphragm connected to the end of said shaft;
means for yieldably urging said shaft and said throttling valve element toward a position which unthrottles flow to said metering valve element;
means for providing flow paths from positions upstream and downstream of said metering valve element to opposite sides of said diaphragm so that the upstream pressure opposes said yieldable urging means.

4. Apparatus as in claim 2 wherein:
said second flow path means includes a housing having a cylindrical chamber therein through which said second fuel flow path passes and a port extending radially from said chamber;
said metering valve element comprises a sleeve rotatable in said cylindrical chamber and having an opening in a wall of the sleeve element registering with said port so that a variable area orifice is defined having an area proportional to the rotation of said sleeve.

5. Apparatus as in claim 1 wherein said flow control valve further comprises:
a cutoff valve element downstream of said first and second flow paths and displaceable between a first position in which flow to said outlet is permitted and a second position wherein flow is blocked; and
means for displacing said valve between said two positions in response to exterior control inputs.

6. Apparatus as in claim 5 wherein:
said cutoff valve element is a piston valve element displaceable against said outlet to block flow from said flow control valve assembly;
said exterior control input displacing means comprises:

means for yieldably urging said piston toward a flow-blocking position and a shoulder formed on said piston so that outlet pressure exerts a force on said piston toward a flow-permitting position;

a means for providing a bleed flow path across said piston thereby creating a pressure differential across said piston tending to displace said piston toward a flow-permitting position, and a means for terminating bleed flow across said piston in response to independent electrical and manual control inputs thereby to equalize pressure across said piston and permit said yieldably urging means to displace said piston to a flow-blocking position.

7. Apparatus as in claim 6 further comprising a manually operable input lever and wherein:

said manual control input means comprises a valve for blocking bleed flow in response to pivoting of said lever to a given position;

said electrical control input means comprises a solenoid valve element displaceable to block said bleed flow path in response to an electrical input signal.

8. Apparatus as in claim 7 wherein said bypass valve comprises: a bistable solenoid valve element displaceable between two positions, one of which permits flow through said first flow path and the other of which blocks flow through said first flow path.

9. Apparatus as in claim 8 wherein:

said second flow path means includes a housing having a cylindrical chamber therein through which said second fluid flow path passes and a port extending radially from said chamber;

said metering valve element comprises a sleeve rotatable in said chamber and having an opening therein to provide a variable area orifice in cooperation with said radial port, said sleeve valve element being connected to said manually operable lever so that rotation of said lever beyond the point at which the manual valve element permits a bleed flow across said piston produces an increasing area for said variable area orifice.

10. Apparatus as in claim 9 further comprising a transducer connected to said manually operable lever for providing an electrical output signal proportional to the position of said lever.

References Cited

UNITED STATES PATENTS

| | | | |
|---|---|---|---|
| 3,390,522 | 7/1968 | Whitehead | 60—39.28 X |
| 3,538,707 | 11/1970 | Karol | 60—39.28 |

CLARENCE R. GORDON, Primary Examiner